United States Patent [19]
Sheinberg

[11] 3,907,513
[45] Sept. 23, 1975

[54] CONTROLLED POROSITY FILTER AND UNIFORM STRUCTURE COMPOSITES

[75] Inventor: Haskell Sheinberg, Los Alamos, N. Mex.

[73] Assignee: The United States Energy Research and Development Administration, Washington, D.C.

[22] Filed: May 30, 1974

[21] Appl. No.: 474,547

[52] U.S. Cl.................................. 29/191.2; 55/525
[51] Int. Cl.² .................. B32B 15/00; B01D 39/08
[58] Field of Search............... 29/191.2, 191, 191.4;
  55/522, 486, 523, 489, 524, 514, 525, 316,
  526; 210/503, 510, 499; 245/2, 8; 161/87,
  88, 89, 90, 94

[56] References Cited
UNITED STATES PATENTS

| | | | |
|---|---|---|---|
| 2,267,918 | 12/1941 | Hildabolt | 29/191.2 UX |
| 2,510,999 | 6/1950 | Oldofredi | 29/191.4 X |
| 2,820,985 | 1/1958 | Cresswell | 210/510 UX |
| 3,241,681 | 3/1966 | Pall | 210/510 |
| 3,578,442 | 5/1971 | Anderson | 75/201 X |
| 3,638,464 | 2/1972 | Winter et al. | 161/87 X |

*Primary Examiner*—L. Dewayne Rutledge
*Assistant Examiner*—O. F. Crutchfield
*Attorney, Agent, or Firm*—Dean E. Carlson; Edward C. Walterscheid

[57] ABSTRACT

Composite materials having controlled porosities comprising a plurality of screens bonded together in substantially parallel fashion, with the meshes of each screen having emplaced therein substantially spherical particles of a diameter which substantially reduces the size of the openings of the meshes. The porosity of the material is controlled by the offset or rotational orientation of the screens in relation to each other. These materials are particularly useful as filters or controlled flow devices.

4 Claims, 4 Drawing Figures

CONTROLLED POROSITY FILTER AND UNIFORM STRUCTURE COMPOSITES

BACKGROUND OF THE INVENTION

The invention described herein was made in the course of, or under, a contract with the U.S. Atomic Energy Commission. It relates to filters and flow control devices and more particularly to filter and flow control devices having a controlled and uniform porosity.

Porous metal structures are widely used in commercial applications and are well known as both filters and flow control devices. Typically, structures of this type are produced by powder metallurgical techniques involving pressing and sintering of metal powders. The porosity in the final structure is produced by the interstitial voids between the particles and by packing defects which may occur. If the powder consists of irregularly shaped particles, it is obvious that the interstitial voids will have varying volumes so that the porosity cannot be accurately controlled.

The situation is improved by using spherical or substantially spherical powders, but even so there are applications in which perfectly spherical powders of the appropriate size may not be available or if available may still not produce the desired or requisite controlled porosity. Thus, for example, in the SNAP space nuclear power program there is a requirement for a thin He vent composed of a stable porous material which is compatible with a Pt-Ir $PuO_2$ encapsulation container at 1150°C for a period of years and which permits an average He flow rate of $6 \times 10^{-6}$ std. $cm^3/s$ with a maximum pressure drop of only 0.1 atm. Additionally, the vent must retain all particles between 0.01 and 4.0 $\mu m$ equivalent spherical diameter and must have a high impact strength.

High temperature compatibility and strength requirements suggest that the vent material be composed of a Pt-Ir alloy. In principle, the vent might be made by powder metallurgical techniques, but all characteristics of the powder must be rigidly controlled because of the strict vent requirements. The particle size retention specification dictates a very fine powder but long term elevated temperature dimensional stability and elimination of pore closure are exceedingly difficult when porous objects are made with fine powders. Use of fine powders is also contraindicated by the low permissible pressure drop. The pressure drop specification demands a relatively high degree of open porosity. This suggests the use of larger powder particles since voids between large particles are large. Unfortunately, strength generally decreases as porosity increases, and high strength is also a requirement. It is thus apparent that (1) a very closely sized fraction of smooth surface spherical powder is required if the vent is to be made by powder metallurgical techniques, and (2) it is exceedingly difficult to fabricate from powders alone vents meeting the foregoing stringent requirements.

While screens could conceivably be pressed together to form a structure having the desired porosity, the use of screens alone is disadvantageous in that for high temperature applications suitable screen materials are available only in coarse screen sizes and the use of coarse screens results in an overly thick structure even if the porosity requirement can be met.

SUMMARY OF THE INVENTION

Very uniform composite structures having controlled porosity and suitable for use as filter and flow control devices may readily be fabricated using a combination of screens and substantially spherical powder. In its broad aspects the invention encompasses a material having a controlled porosity which comprises a plurality of substantially parallel layers bonded together, with each of the layers comprising a screen having emplaced in each mesh thereof a substantially spherical particle of a diameter which substantially reduces the size of the mesh opening and the screen meshes in each layer shifted relative to the screen meshes in all other layers. The shift may take the form of an offset of the screen meshes in one layer from those in adjacent layers, or an alignment of all screen meshes, along a common axis but with the screen of each layer rotated with respect to those of other layers, or a combination of offset and rotation.

When the layers are bonded together, the screen meshes form interconnecting pores. The size of the pores is dependent on the degree of offset or rotation and the number of layers used to form the structure. The layers may be bonded to one another by cold pressing and sintering, diffusion bonding, or hot pressing. The pore size may be further altered or reduced by a hot pressing or a subsequent rolling operation. Metal screens and powders are particularly useful as the components of the composite structures of this invention, but they may be formed from practically any material which can be woven to form a screen and which can be provided in spherical or substantially spherical form. Likewise, the screens and filler particles need not be composed of the same material, but may be any materials compatible with one another.

DESCRIPTION OF THE PREFERRED EMBODIMENT

Figure 1:
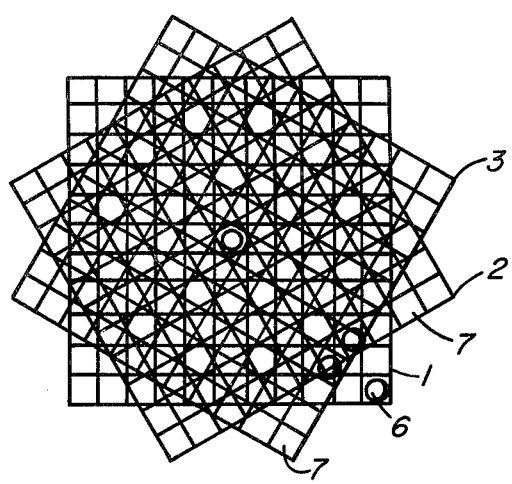
FIG. 1 is a schematic view of an embodiment of the invention showing a plurality of screens rotated in relation to one another.

The composite structures of the invention are best illustrated by reference to FIGS. 1 through 4. A plurality of screens 1, 2, 3, formed by warps 4 and woofs 5 have substantially spherical particles 6 emplaced within their openings 7. Although warps 4 and woofs 5 are shown with the same diameter, the invention is not limited to embodiments in which they have the same diameter. Likewise, although the weave of screens 1, 2, 3 is shown as producing square openings 7, this is not critical to the invention, and any weave may be used so long as openings 7 are produced in a regular and uniform pattern. The diameter of particles 6 may vary substantially, but preferably is such as to reduce the area of the openings 7 by at least 55 percent. Typically, warps 4, woofs 5, and particles 6 are of the same material; however, this need not be so as long as the materials of which they are composed are compatible under the conditions of formation of the structure and under the operating conditions at which the structure will be used.

Figure 3:
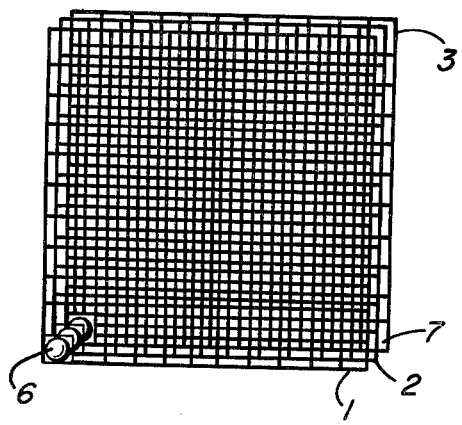
FIG. 3 is a schematic view of an embodiment of the invention showing a plurality of screens offset in relation to one another.

In both FIGS. 1 and 3, screen 1 has the same alignment in relation to vertical axis Y; however, screens 2 and 3 have differing offset or rotational alignments about axis Y. Thus, for example, in FIG. 3 screens 2 and 3 are offset along both the X and the Z axes, whereas in FIG. 1 there is no offset, but screens 2 and 3 are rotated about the Y axis, with each screen having a different degree of rotation. Note that in neither case is there a change in the orientation of the plane of the screen.

Figure 2:
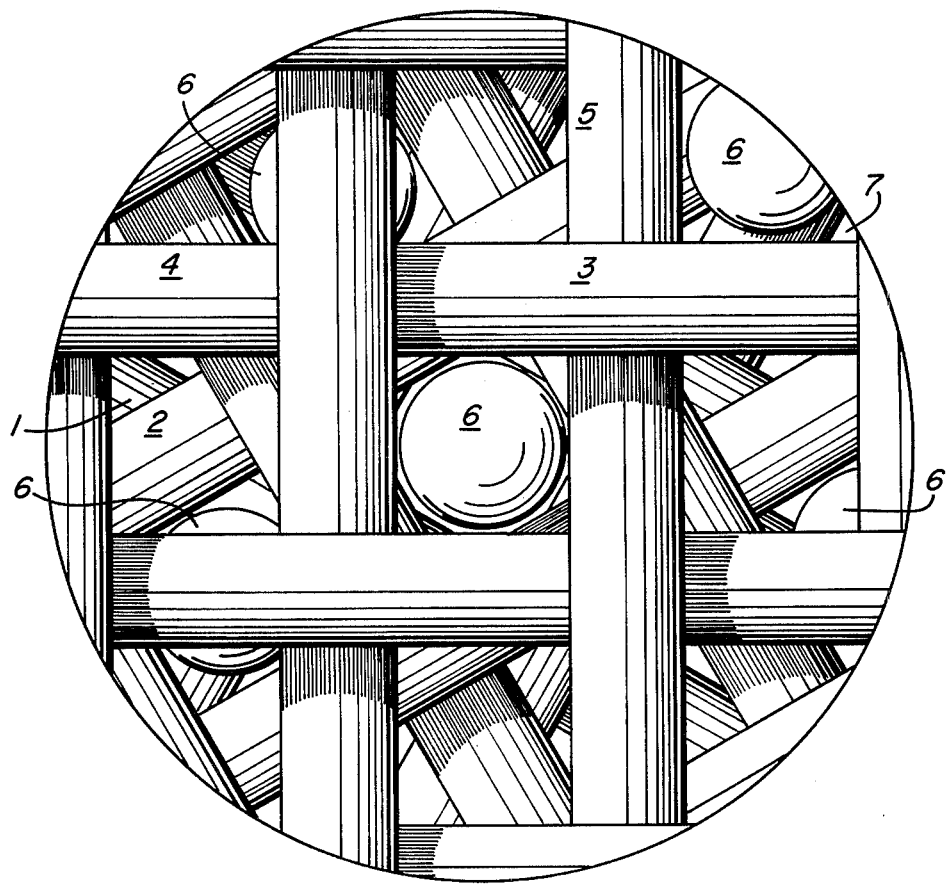
FIG. 2 is an enlarged view of a portion of a composite structure in accordance with the embodiment of FIG. 1.
Figure 4:
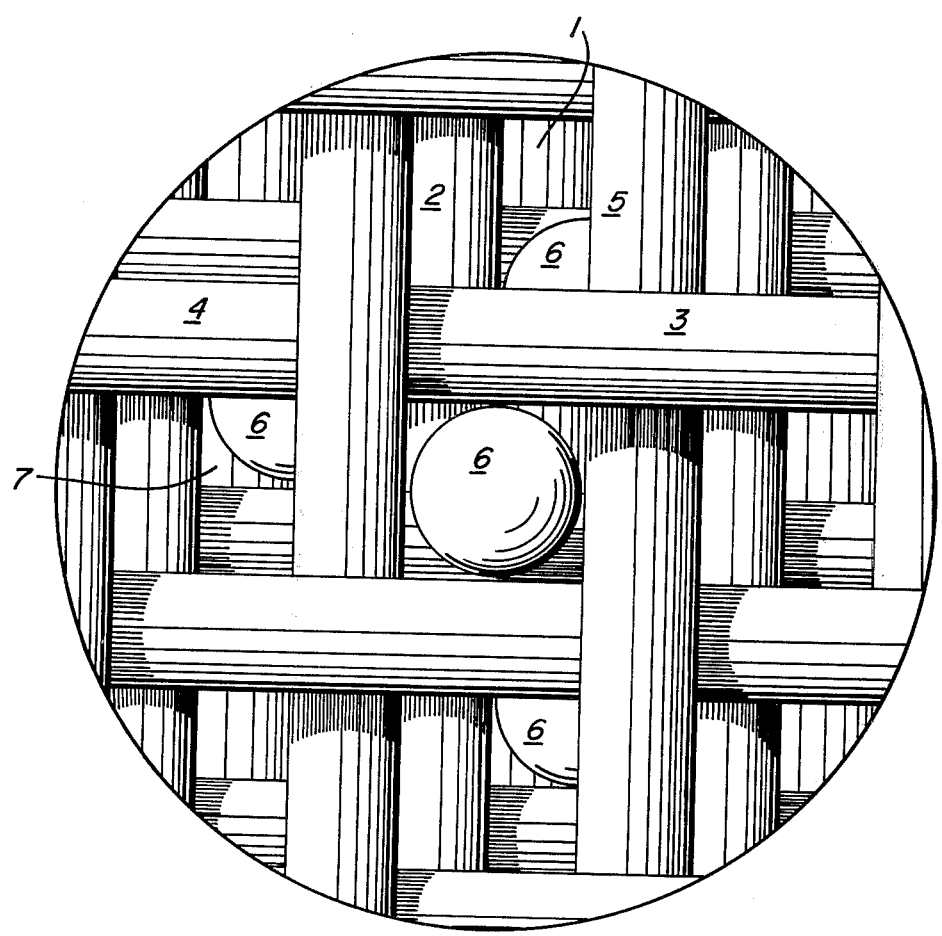
FIG. 4 is an enlarged view of a portion of a composite structure in accordance with the embodiment of FIG. 3.

It is apparent from FIGS. 2 and 4 that when the screens and particles are bonded together, a uniformly structured composite is produced in which the porosity may readily be controlled by varying the size of openings 7 or particles 6 or both, the offset or rotational alignment of the screens or both, and the number of screens used. A particularly advantageous feature of these structures is that the porosity may be controlled through use of much coarser screens and particles than would otherwise be possible were only screens or powders used. That is to say, mesh size and particle diameter may be substantially larger, resulting in lower surface area and more stable porosity at elevated temperature.

For screens and powders which may be bonded by hot pressing or sintering, the powder may be emplaced within the screen meshes by a very simple technique. An adhesive backing is applied to one side of the screen and the powder is sifted onto the screen from the other side. During this step, the screen may be gently agitated if desired. Within each opening a particle adhers to the adhesive. All loose particles are then removed, and as many screens as desired are hot pressed together at the appropriate offset or rotational orientation to produce the composite structure. During the course of the hot pressing, the adhesive material is burned away, leaving only the screens and particles as a part of the composite structure.

EXAMPLE

Pseudospherical copper powder screen −100 +120 mesh U.S.S. was used to fill the openings of 100 mesh copper screen backed with Scotch brand transparent tape. Four 50.8 mm diameter disks of the powder filled screen were angularly offset approximately 22° in a graphite die and the assembly was pressure bonded at 1273 K and 5.5 MPa to 76% of theoretical density. A tapered 5.08 mm diameter disk (0.58 mm thick) machined from this 50.8 mm diameter disk by electrical discharge machining was bonded into the tapered cavity of a 12.7 mm o.d. by 0.76 mm thick copper disk by pressing in a graphite die assembly at 2.6 MPa and 1073 K for flow testing of the vent. Results of flow testing are shown in the Table.

Table

| Flow | FLOW RATE THROUGH COPPER VENTS | Conditions | |
|---|---|---|---|
| Total flow, μkg | 3.473 | Pressure drop, Pa | 44.811 |
| Flow rate, nkg/s | 0.111 4 | Temp, °C | 29.00 |
| Vol flow rate, nm³/s | 0.564 | Time, ks | 31.200 |
| Total flow, μkg | 4.982 | Pressure drop, Pa | 21.017 |
| Flow rate, nkg/s | 0.065 9 | Temp, °C | 25.50 |
| Vol flow rate, nm³/s | 0.328 | Time, ks | 75.600 |
| Total flow, μkg | 1.758 | Pressure drop, Pa | 8.000 |
| Flow rate, nkg/s | 0.028 3 | Temp, °C | 25.50 |
| Vol flow rate nm³/s | 0.141 | Time, ks | 62.100 |

What I claim is:

1. A material having a controlled porosity which comprises a plurality of substantially parallel layers bonded together, each of said layers comprising a screen having (a) emplaced in each mesh thereof a substantially spherical particle which substantially reduces the size of the opening of said mesh, and (b) its screen meshes shifted a uniform distance relative to the screen meshes in adjoining layers.

2. The material of claim 1 wherein said shift in the position of the screen meshes of each layer is an offset of said screen in the plane of each layer.

3. The material of claim 1 wherein said shift in the position of the screen meshes of each layer is a rotation of said screen in the plane of each layer.

4. The material of claim 1 wherein said shift in the position of the screen meshes of each layer is a combination of offset and rotation of said screen in the plane of each layer.

* * * * *